Jan. 29, 1946.  C. V. BRADY  2,393,739
VALVED BAG
Filed Nov. 12, 1943   3 Sheets-Sheet 1
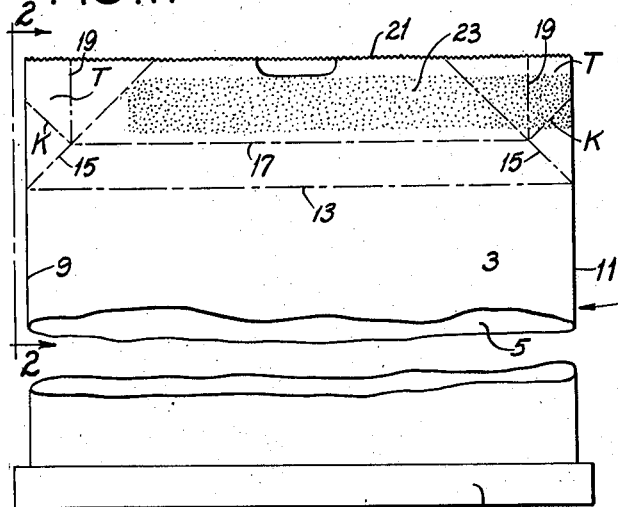
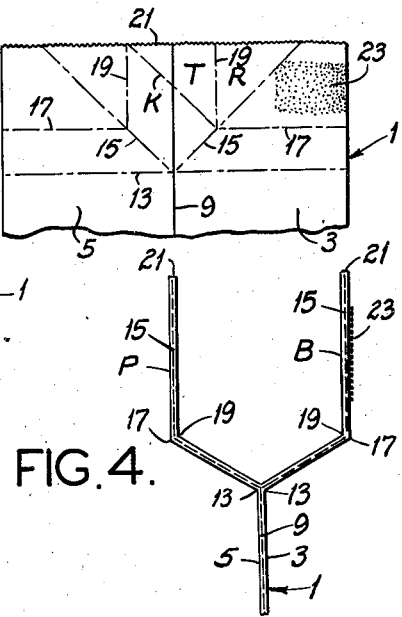
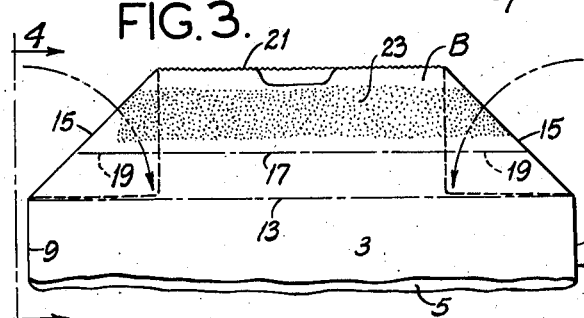
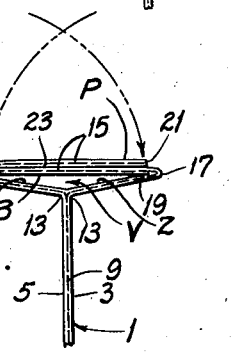
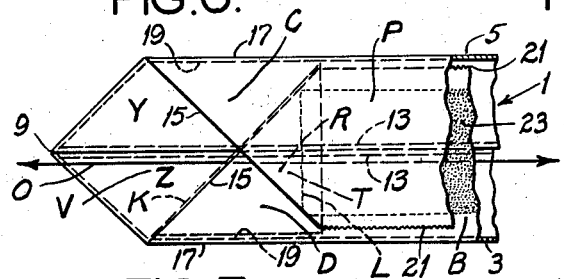
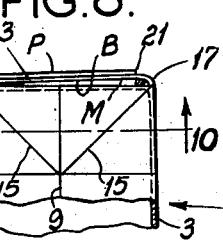
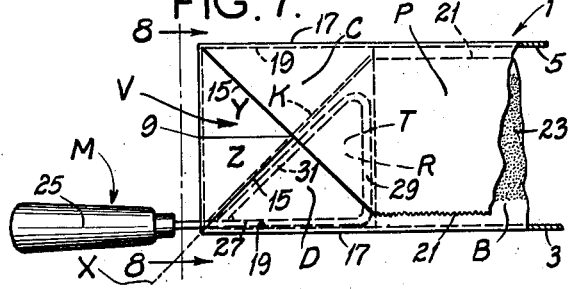
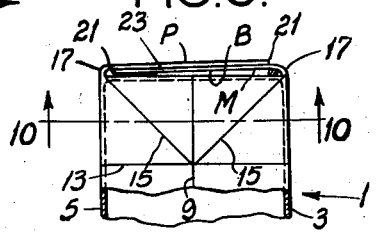
Charles V. Brady,
Inventor.
Haynes and Koenig,
Attorneys.

Jan. 29, 1946. C. V. BRADY 2,393,739
VALVED BAG
Filed Nov. 12, 1943 3 Sheets-Sheet 2
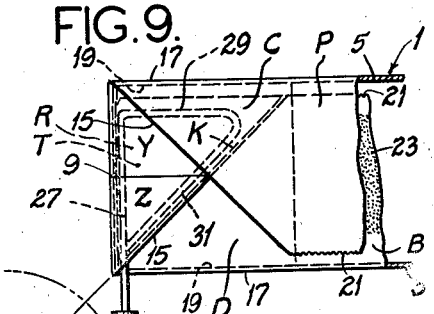
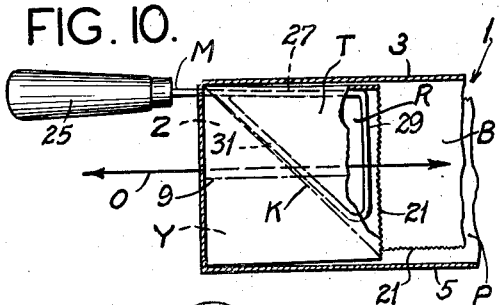
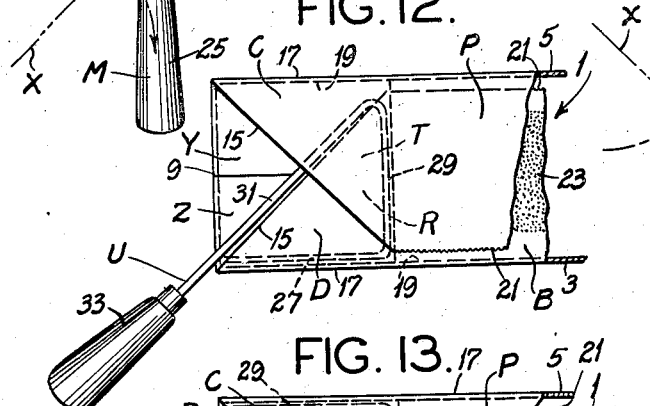
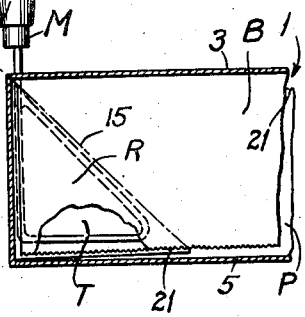
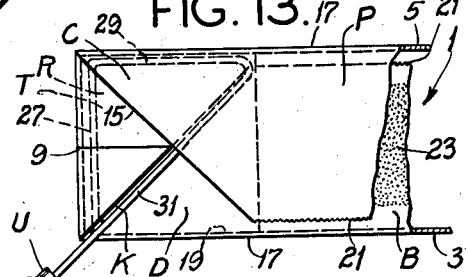
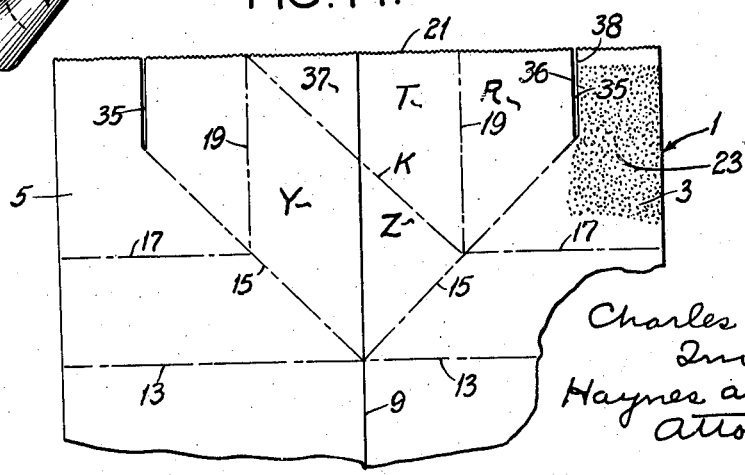
Charles V. Brady,
Inventor
Haynes and Koenig
Attorneys Jan. 29, 1946.    C. V. BRADY    2,393,739
VALVED BAG
Filed Nov. 12, 1943    3 Sheets-Sheet 3
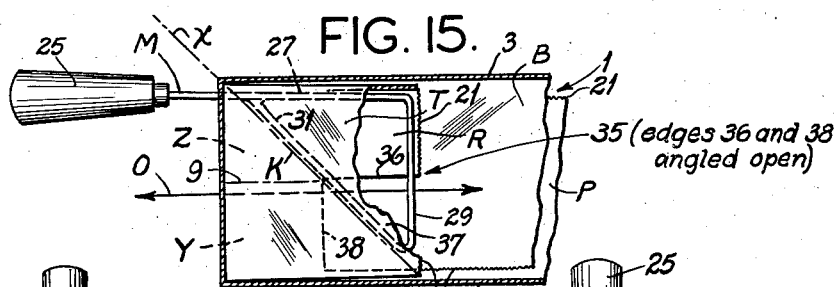
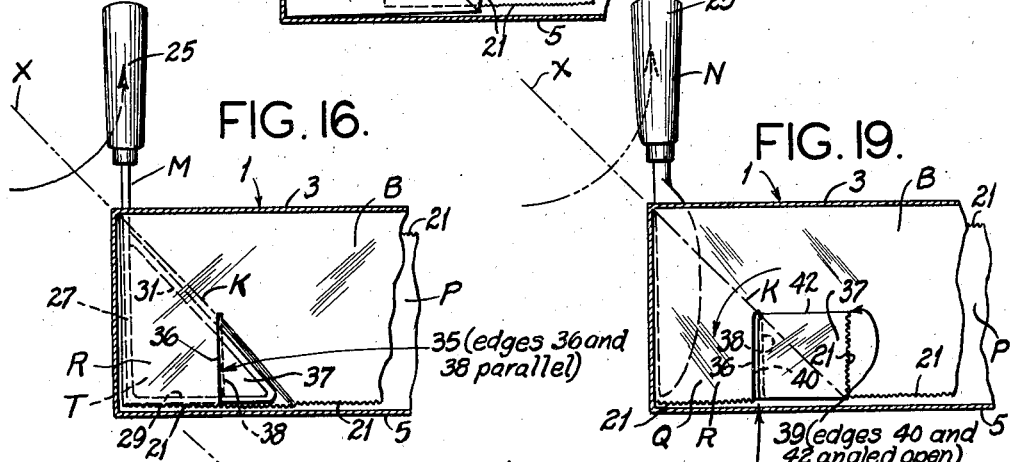
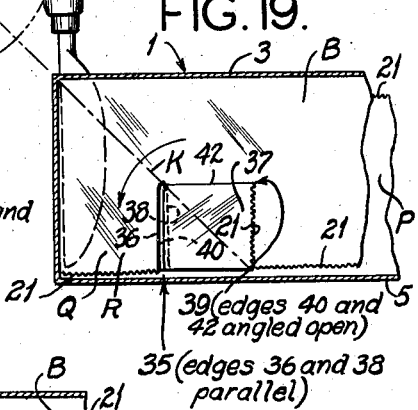
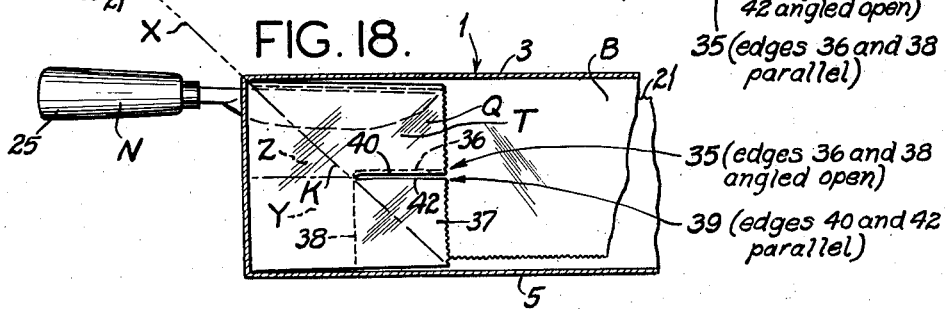
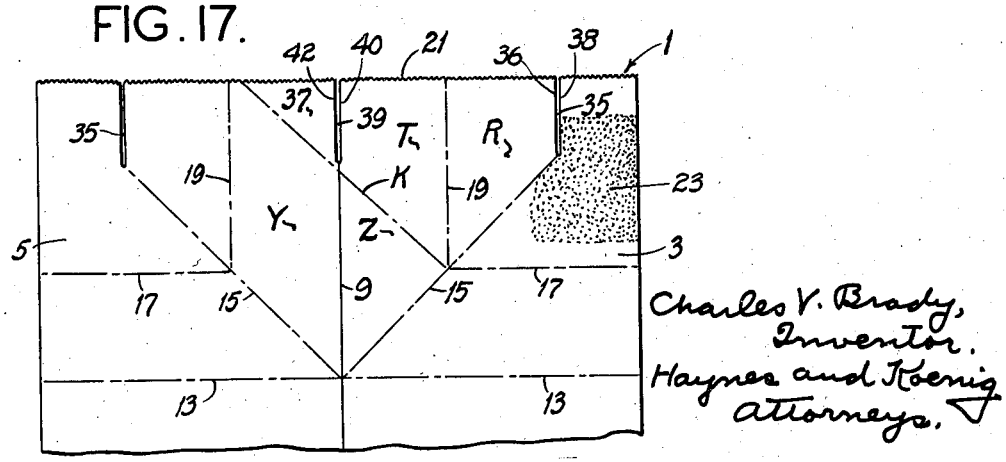
Charles V. Brady,
Inventor.
Haynes and Koenig
Attorneys.

Patented Jan. 29, 1946

2,393,739

UNITED STATES PATENT OFFICE 2,393,739

VALVED BAG

Charles V. Brady, Webster Groves, Mo., assignor to Bemis Bro. Bag Company, St. Louis, Mo., a corporation of Missouri Application November 12, 1943, Serial No. 510,039

10 Claims. (Cl. 229—62.5)

This invention relates to valved bags, and with regard to certain more specific features, to improved valves therefor and methods of manipulating them.

Among the several objects of the invention may be noted the provision of a very simple and economical form of valved bag which, by means of a simple manipulation from the exterior of the bag when filled and closed, will permit an open valve to be closed in the interior of the bag; the provision of a valve in a bag of the class described which, when closed, is substantially resistant to leakage; and the provision of an improvement of the class described which is applicable without complications to the various forms of valves and bags now in use. Other objects will be in part obvious and in part pointed out hereinafter.

The invention accordingly comprises the steps and sequence of steps, elements and combinations of elements, features of construction, and arrangements of parts which will be exemplified in the structures and methods hereinafter described, and the scope of the application of which will be indicated in the following claims.

In the accompanying drawings, in which are illustrated several of various possible embodiments of the invention, Fig. 1 is a front elevation of an unfilled bag illustrating the invention;

Fig. 2 is a left-end view taken from line 2—2 of Fig. 1 but showing the left edge of the bag of Fig. 1 spread out to show certain score lines;

Fig. 3 is a fragmentary view similar to Fig. 1 but showing a succeeding step in forming a bag closure and valve;

Fig. 4 is an enlarged schematic left-edge view of Fig. 3 taken from line 4—4 of Fig. 3 but angled out somewhat;

Fig. 5 is a view similar to Fig. 4 but showing a succeeding bag closure step;

Fig. 6 is a partial plan view of Fig. 5 prior to bag filling;

Fig. 7 is a view similar to Fig. 6 but showing the bag filled and the insertion of a closing tool;

Fig. 8 is a left-end view of Fig. 7 taken on line 8—8 of Fig. 7;

Fig. 9 is a view similar to Fig. 7 but showing said tool rotated to a closing position;

Fig. 10 is a horizontal section taken on line 10—10 of Fig. 8 and showing the appearance from the inside of the open valve and inserted closing tool;

Fig. 11 is a view similar to Fig. 10 but showing said tool in closing position;

Fig. 12 is a view similar to Fig. 7 showing an alternative form of closing tool;

Fig. 13 is a view similar to Fig. 12 showing said tool turned 180° on its axis;

Fig. 14 is a view similar to Fig. 12 showing a modification of the invention;

Fig. 15 is an inside view similar to Fig. 10 but illustrating said modification;

Fig. 16 is a view similar to Fig. 15 showing a closed position of the valve;

Fig. 17 is a view similar to Fig. 2 but showing another modification;

Fig. 18 is a view similar to Fig. 10 but showing said last-named modification; and, Fig. 19 is a view similar to Fig. 10 but showing the last-named (third) modification in closed position of the valve.

Similar reference characters indicate corresponding parts throughout the several views of the drawings.

The present invention applies generally to various types of paper and like valves, for valved bags, its primary point of departure being to provide for closure of the valve on the inside of the bag by a hand operation performed from the outside of the bag. Additional points of departure are the provision of new scoring and slitting for enhancing said closure operation.

Referring now more particularly to Figs. 1–11, there is shown at numeral 1 a bag having a front 3, back 5 and a bottom seam 7. The front and back meet at lateral edges 9 and 11. A mouth edge 21 may be toothed, as usual and as indicated, or smooth if desired. This constitutes an ungusseted bag, but the invention is applicable also to gusseted bags by suitable modifications which will be obvious to those skilled in the art and from the following. Peripherally around the body of the bag is a score line 13, above which is to be the bag closure arrangement, including the valve to be described.

The closure construction consists in 45° score lines 15 on both sides of the bag, both on the front and back. Score lines 15 extend from the intersection of the score line 13 with the edges 9 and 11, and up to the mouth edge 21, as shown.

Parallel to and above the score line 13 are flap-hinging score lines 17. These, as shown, need not run past the score lines 15, but, if desired, they may. As will be seen later, the lines 17 form the hinge edges of the top of the bag, forming closure flaps.

Extending at ninety degrees to the score lines 17 and beginning at the score lines 15 are vertical score lines 19 which, in the final condition of the valve, lie next to score lines 17 and form lateral edges of the valve.

An important point of the present invention is in the provision of an additional score line or crease K, reaching diagonally from the intersection or junction of one set of score lines 15, 17 and 19 to a point where the other one of the lines 19 intersects the edge 21. The crease K forms the diagonal of a square area bounded by the lines 19, a portion of the bag mouth 21 between lines 19 and an imaginary line (not shown) between the ends of creases 17. This last-mentioned line could be the extension of lines 17. This square portion ultimately forms the bottom of the valve after the bag has been filled. Within it is a triangle T which may be hinged up to form a valve closure as will appear. A band of adhesive 23 is applied to the bag above lines 17 except that it is not carried over the valve-forming portion within lines 15 at one (the left) side of the bag. On the other (the right) side of the bag this adhesive band 23 is carried on between the lines 15, because at this right side no valve is to be formed.

To form the bag closure, including the valve, the triangles bounded by the score lines 15 and the adjacent edge of the bag are turned down and inward as shown in Figs. 3 and 4 (Fig. 4 being enlarged and spread out). This results in truncated flaps P and B which are left by turning in the triangular parts as stated. The flap B, which carries adhesive 23, is then first turned down and the other flap P is turned over it, as indicated in Fig. 5. The adhesive holds the flaps together and, at the right side of the bag, closes what might become a valve, but at the left-hand side leaves openable the improved valve V (Fig. 6). This valve V is now composed of bottom areas Y and Z hinged centrally at the turned-in portion of edge 9. These areas Y and Z are hinged laterally on lines 19 which lie parallel to and within lines 17. The valve V is also composed of top covering triangles C and D, the former lying over the latter and being attached where lapped at L. However, C and D are not attached to Y and Z in the absence of adhesive between lines 15 at the left end of the bag. Thus, a filling tube may be inserted and withdrawn along the arrow O for filling the preclosed bag through the open tubular valve V. Filling converts the edge of the bag from the form shown in Fig. 6 to that shown in Fig. 7.

It will be noted that the folding results in the score line K lying closely adjacent to the hypotenuse of the triangle D in the top of the valve, and substantially at right angles to the hypotenuse of the triangle C. The hypotenuse of triangle D is part of the underlying one of the lines 15.

After filling of the bag, it is possible positively to close the valve by folding its triangular part T along with the overlying triangle R on their common hinge line K and said part of line 15. It may be noted that the triangles T and R form a larger right-angle triangle when unfolded (see Fig. 2). Space, of course, within the bag is required for this valve-closing folding but bags are not usually filled entirely to the top. While, as will later be described, an ordinary knife or the like may be inserted into the valve along the line where the filling spout was withdrawn and the triangular portions T and R turned over on the line K, I have provided a handy tool for the purpose shown at M in Figs. 7–11. It consists of a handle 25 to which is attached a triangular wire frame having sides 27, 29 and a diagonal 31. The form 27, 29, 31 is a right triangle.

The tool, as indicated in Fig. 7, is inserted with the diagonal 31 parallel and inside of the line K. The insertion is made between the lower areas Y—Z on the one hand and the upper areas C—D on the other hand. This places side 27 of the tool adjacent to hinge 15. Then, by turning the handle 25 over from the position shown in Fig. 7 to that shown in Fig. 9 (a 180° conical movement around the axis X), the mouth portion 21 of the valve is turned over adjacent to the other side of the bag as indicated in Fig. 9. Figs. 10 and 11 illustrate the operation from the inside. The result is that the parts of the valve tube that were formed by the underlying triangle T and overlying triangle R are turned respectively on lines K and 15. Then, by turning the filled bag over, preferably before the tool is withdrawn, the contents press against the laterally turned triangular portions R, T and hold them in closed sealing position, whereupon the tool may be withdrawn. It is clear from Figs. 10 and 11 how the score line K becomes, along with part of one line 15, a double hinge for the inwardly directed valve, said hinge being the diagonal of the square. A very positive mechanical seal is obtained, particularly in view of the fact that when the bag is turned over the contents will hold the hinged triangles against one another with the opening between triangles directed toward the wall of the bag (Fig. 11).

Figs. 12 and 13 correspond respectively to Figs. 7 and 9, except that they show a different form of operating tool. This tool U has its handle 33 coaxial with the hypotenuse 31 of the triangular 27, 29, 31. In this case the tool is inserted into the valve as shown in Fig. 12 and then the handle 33 is simply rotated on the axis of the hypotenuse 31 to the position shown in Fig. 13, which has the same effect of diagonally folding over a double-layered triangular half of the valve onto the other double-layered triangular half thereof, thus closing it. With this form of tool the handle needs not to be moved on a conical surface as in Figs. 7–9, but it is simply rotated on its own axis.

In Fig. 14 is shown an end view of an alternative form of the invention corresponding to the view shown in Fig. 1 but enlarged. Like numerals designate like parts where applicable; otherwise not. In this case a longer valve is obtained by running the score line 15 up to the lower ends of slits 35, which are cut into the front and rear bag walls 3 and 5 at right angles to the mouth edge 21. One side 36 of one of these slits 35 appears on the lower side of the valve when formed (Fig. 15). The other side 38 of this slit 35 is at a right angle and is in the plane of flap Y. When the tool M is inserted and rotated to the position shown in Fig. 16, the folding is as before, and the side 36 of slit 35 is carried to the right angular positions shown. This places side 36 of slit 35 parallel to side 38 but with a portion 37 of the bottom of the valve in between. There is a tendency for the portion 37, which is not relieved by any slit, to spring back. In this connection it should be noted that no spring-back can occur when the bag is inverted and the contents are loaded on the valve. However, the form of the valve shown in Figs. 1–13 will even remain closed when the bag is upright, provided the crease or score line 15 is made flexible enough and particularly if the toothed edge part 21 on the valve frictionally contacts the adjacent face of the bag after folding. In order to overcome other parallel perpendicular score line with the other one of the diagonal score lines and forming an intercept thereon at a distance measured from the bag mouth which is equal to the distance between said parallel perpendicular score lines.

3. A bag valve made up of an end area near a corner of the bag at its mouth, one edge of the bag providing a central score line for making a hinge in what is to become the bottom of the valve, first and second diagonal score lines meeting on said central score line and defining a triangular flat area to be turned in to form the valve and also defining end portions of front and back flaps to be turned over for closing the bag, score lines parallel to the mouth of the bag and meeting said diagonal score lines, a pair of score lines perpendicular to said edge-forming score line, said perpendicular score lines respectively meeting said first and second diagonal score lines at the score lines which are parallel to the bag mouth, said perpendicular score lines defining sideward hinges on the ultimately formed valve, said perpendicular score lines meeting the bag mouth, and a third diagonal score line running from the point of intersection of one of said perpendicular score lines with the mouth and to the point of intersection of the other perpendicular score line with said second diagonal score line, said third diagonal score line being located so as to lie adjacent to a portion of said second diagonal score line when the valve is folded into its final position with the second diagonal score line over the third diagonal score line, whereby a tool may be inserted into the resulting valve and fulcrumed on the said second diagonal score line to turn one inner portion of the valve thereon and on the said third diagonal score line.

4. A bag valve construction comprising an end area at one corner of a bag having a mouth edge, a pair of diagonal score lines at least in part defining an area to be turned in, score lines spaced from the mouth edge and reaching to said diagonal lines and defining wall flaps to be turned over to close the bag, parallel score lines reaching from the mouth edge to said diagonal score lines where they are met by said score lines spaced from the mouth edge, and a third diagonal score line reaching from a point of intersection of one parallel score line with the mouth edge to the point of intersection of the other parallel score line with one of said pair of diagonal score lines, whereby when the valve is formed, a portion of said last-named diagonal score line will lie over said third diagonal score line between the parallel score lines.

5. A bag valve construction comprising an end area at one corner of a bag having a mouth edge, first and second diagonal score lines at least in part defining an area to be turned in, score lines parallel to the mouth and reaching to said diagonal lines and defining wall flaps to be lapped to close the bag, the flap containing part of the first diagonal score line being underneath, parallel score lines perpendicular to the mouth and reaching from it to said diagonal score lines where they are met by said score lines parallel to the mouth, and a third diagonal score line reaching from a point of intersection with the mouth of one perpendicular score line to the point of intersection of the other perpendicular score line with the first diagonal score line, whereby when the valve is formed, a portion of said first diagonal score line will lie directly over and adjacent to said third score line to act as a fulcrum for a tool inserted in the finished valve to turn it back on itself on said third diagonal score line.

6. A bag valve made up of an end area near a corner of the bag at its mouth, comprising when flat two diagonal score lines related perpendicularly and defining a triangular area to be turned in to form the valve and defining end portions of front and back flaps to be turned over for closing the bag, flap-hinging score lines parallel to the mouth of the bag and meeting said diagonal score lines, a pair of parallel score lines perpendicular to said flap-hinging score lines and meeting the bag mouth, said parallel perpendicular score lines defining sideward hinges of the ultimately formed valve, and a third diagonal score line running from the point of intersection of one of said parallel perpendicular score lines with the mouth to the point of meeting of the other perpendicular score line with one of the perpendicular diagonal score lines, and a peripheral score line parallel to the bag mouth and passing through the point where said two diagonal score lines meet.

7. A bag valve made up of an end area near a corner of the bag at its mouth, comprising when flat a pair of diagonal and relatively perpendicular score lines defining a triangular area to be turned in to form the valve and defining the ends of front and back flaps to be turned over for closing the bag, flap-hinging score lines parallel to the mouth of the bag and meeting said diagonal score lines, a pair of parallel score lines perpendicular to said flap-hinging score lines and meeting the bag mouth, said parallel perpendicular score lines defining sideward hinges of the ultimately formed valve, and a third diagonal score line running from the point of intersection of one of said parallel perpendicular score lines with the mouth to the point of meeting of the other parallel perpendicular score line with one of the pair of diagonal score lines, and a peripheral score line parallel to the bag mouth and passing through the point where said two diagonal score lines meet, said third diagonal score line being perpendicular to one of said pair of diagonal score lines and being the diagonal of a square of which the said parallel perpendicular score lines are sides.

8. A bag valve made up of an end area near a corner of the bag at its mouth edge, comprising when flat a pair of diagonal score lines at least in part defining an area to be turned in to form the valve and also defining end portions of front and back flaps to be turned over for closing the bag, a pair of hinge-forming score lines extending respectively from points on said diagonal score lines and meeting the bag mouth edge to define sideward hinges of the valve utlimately formed, and a third diagonal score line running substantially from the point at which said edge is met by one of said pair of hinge-forming score lines and extending substantially to the other of said pair of diagonal score lines where met by the other hinge-forming score line.

9. A bag valve made up of an end area near a corner of the bag at its mouth edge, comprising when flat a pair of parallel slits extending from the mouth edge and a pair of diagonal score lines extending respectively from the slits and defining with the slits an area to be turned in to form the valve and also defining end portions of front and back flaps to be turned over for closing the bag, a pair of parallel score lines extending to said edge and to the diagonal score lines to define sideward hinges of the valve ultimately formed, this condition when the slitted construction of Figs. 14–16 is used, the construction of Figs. 17–19 has been devised, which is as follows:

Fig. 17 is a view corresponding to Fig. 14 but showing a third slit 39 which extends down from the edge 21 approximately to where the diagonal score line K crosses the edge 9. This slit 39 finds an ultimate position in the bottom areas Y and Z of the valve (Fig. 18). It has two sides, 40 and 42. Side 40 is in the plane of side 36 of slit 35. Side 42 is closely adjacent. In other words, this places corresponding central slit portions in the middle of the top and bottom portions of the valve as shown in Fig. 18. Then, when a tool such as a knife end is inserted into the valve and rotated, as indicated in Figs. 18 and 19 (which are views inside of the bag looking up), the knife will operate (upon rotation) selectively upon the quadrilateral portion Q, without acting upon the small triangular portion 37. Thus, when the knife is rotated to the Fig. 19 position, the portion Q is rotated 90° with its opening against the side of the bag wall, leaving part 37 extending inwardly. Side 40 of slit 39 and side 36 of slit 35 both move 90° to lie next to side 38 of slit 35. Side 42 of slit 39 remains in the plane of 37. While the portion 37 has an inwardly directed opening, it is small and tends to remain shut, particularly in view of the overlying position of the quadrilateral area Q.

It will be seen that closure of the valve does not depend upon mere pressure of material from the inside, or the mere proper lay of paper in the upper and lower portions of the valve. There is a predetermined operation performed interiorally on the valve to hinge it shut by means of a tool which reaches inwardly from the outside of the valve and is operated from the outside of the bag. Furthermore, the operation of closing the valve is definite, and quite simple to perform. The operator knows positively when the valve is shut and that it will remain shut, particularly in the case where the bag is overturned before or while the tool is being extracted. Also, instead of presenting a multi-ply feather edge against escape of material from the bag, there is presented inwardly a definitely folded closed edge clear across the valve in Figs. 1–13 and mostly across it in the other figures.

It will be noted that the valve is in effect an inwardly directed tube, the bottom walls Y and Z of which are collapsible downwardly along the line 9 to form an entry (Fig. 5). These areas practically form a square when the bag is filled (Fig. 7), and it is this square to which the score line K is a diagonal. The square form assures that the mouth of the valve which is turned over against the side wall of the bag will come more or less flush with that wall. If any deviation is made from a square form, it is preferable that it be elongated along the axis of the tube so that the inner end 21 of the valve will somewhat frictionally engage the bag wall. Shortening the square along the length of the valve is not so desirable, although it will provide a workable construction, particularly when used in connection with overturning of the bag as described.

It will also be noted that the diagonal crease or score line K lies adjacent to one of the score lines 15 when the valve is completed. Thus, the closing action of the valve is not only a hinging movement around K but also around the adjacent line 15. However, the existence of merely the score line 15 is not always enough, because without the score line K in thick materials the bottom of the valve is so stiff crosswise that the folding cannot be carried out as well. However, with single-ply paper, the operation of the tool may itself cause a satisfactory break along a line corresponding to K without preliminary scoring. This is mentioned because I consider part of my invention the stated insertion of a tool into the bag valve and rotation of it to cause the inner portion of the valve to be turned back on itself, one triangular portion being brought against the other triangular portion of the square abovementioned.

It will be noted that since the diagonal score line K, in the final position of the valve, lies parallel to a portion of one of the right angular score lines 15 (Fig. 6) the score line 15 acts as a fulcrum for the part of the tool that extends out from the bag. Thus no judgment is required on the part of the operator as to what axis the tool should be rotated on.

It is also to be noted that the portion of the edge-forming score line 9, above the right-angular diagonal line 15, may be eliminated, in which event a valve tube will be formed the bottom of which is not hinged centrally but only on a diagonal score line K.

It is to be understood that the invention is applicable also to gusseted bags and to bags made of webs of material equivalent to paper for the purpose of the invention. The terms score line and crease are to be understood as synonymous for means designed to form a hinge.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A bag valve made up of an end area near a corner of the bag at its mouth edge, comprising when flat two diagonal score lines defining a triangular area to be turned in to form the valve and defining end portions of front and back flaps to be turned over for closing the bag, flap-hinging score lines parallel to the mouth of the bag and meeting said diagonal score lines, a pair of parallel score lines perpendicular to said flap-hinging score lines and meeting the bag mouth edge, said parallel perpendicular score lines defining sideward hinges of the ultimately formed valve, and a third diagonal score line running from the point of intersection of one of said parallel perpendicular score lines with the mouth edge to the point of meeting of the other parallel perpendicular score line with one of the first-mentioned diagonal score lines.

2. A bag valve made up of an end area near a corner of the bag at its mouth edge, comprising when flat two diagonal score lines defining a triangular area to be turned in to form the valve and defining end portions of front and back flaps to be turned over for closing the bag, flap-hinging score lines parallel to the mouth edge of the bag and meeting said diagonal score lines, a pair of parallel score lines perpendicular to said flap-hinging score line and meeting the bag mouth edge, said parallel perpendicular score lines defining sideward hinges of the ultimately formed valve, and a third diagonal score line running from the point of intersection of one of said parallel perpendicular score lines with the mouth edge to the point of intersection of the and a third diagonal score line running from the point at which said edge is met by one of said pair of hinge-forming score lines and extending to the other of said pair of diagonal score lines where met by the other hinge-forming score line.

10. A bag valve made up of an end area near a corner of the bag at its mouth edge, comprising when flat two slits from the mouth edge and a pair of diagonal score lines defining with the slits an area to be turned in to form the valve and defining end portions of front and back flaps to be turned over for closing the bag, a pair of parallel score lines perpendicular to the bag mouth edge and extending to the diagonal score lines to define sideward hinges of the valve ultimately formed, and a third diagonal score line running from the point of intersection of one of said parallel perpendicular score lines with the mouth edge to the meeting point between the other parallel score line with one of said pair of diagonal score lines, said area having a slit midway between the first-mentioned slits and extending from the mouth edge to a point near the mid-portion of the third diagonal line.

CHARLES V. BRADY.